(12) United States Patent
Arye et al.

(10) Patent No.: US 10,771,833 B2
(45) Date of Patent: Sep. 8, 2020

(54) SYSTEM AND METHOD FOR IMPROVING STREAMING VIDEO VIA BETTER BUFFER MANAGEMENT

(71) Applicant: The Trustees of Princeton University, Princeton, NJ (US)

(72) Inventors: Matvey Arye, New York, NY (US); Michael J. Freedman, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 5 days.

(21) Appl. No.: 16/302,363

(22) PCT Filed: May 31, 2017

(86) PCT No.: PCT/US2017/035126
§ 371 (c)(1),
(2) Date: Nov. 16, 2018

(87) PCT Pub. No.: WO2017/210252
PCT Pub. Date: Dec. 7, 2017

(65) Prior Publication Data
US 2019/0306551 A1    Oct. 3, 2019

Related U.S. Application Data

(60) Provisional application No. 62/343,279, filed on May 31, 2016.

(51) Int. Cl.
*H04N 21/2662* (2011.01)
*H04L 12/26* (2006.01)
(Continued)

(52) U.S. Cl.
CPC ....... *H04N 21/2662* (2013.01); *G06F 8/4451* (2013.01); *H04L 43/0864* (2013.01);
(Continued)

(58) Field of Classification Search
CPC ... G06F 8/4451; H04L 43/0864; H04L 47/12; H04L 47/27; H04L 47/29; H04L 65/601;
(Continued)

(56) References Cited

U.S. PATENT DOCUMENTS

2013/0044598 A1    2/2013    Zhang et al.
2013/0227080 A1    8/2013    Gao et al.
(Continued)

FOREIGN PATENT DOCUMENTS

WO    20170210252 A1    12/2017

OTHER PUBLICATIONS

International Search Report and Written Opinion for International Application No. PCT/US2017/035126, entitled: "System and Method for Improving Streaming Video via Better Buffer Management", dated Jul. 24, 2017.
(Continued)

*Primary Examiner* — Azizul Choudhury
(74) *Attorney, Agent, or Firm* — Hamilton, Brook, Smith & Reynolds, P.C.

(57) ABSTRACT

Disclosed are solutions for improving Internet video streaming. A first number is determined based on one or more parameters, including network conditions. A second number is then determined corresponding to a number of video segments that is greater than or equal in size to a third number determined based on a bandwidth-delay product of the network to a remote machine. The second number of video segments is then requested in a pipelined fashion. Pipelined requests are stopped when a predetermined size of the video has been requested that is greater than or equal to the first number. Alternatively, a request is sent to the remote machine to send a portion of the video, where the size of the portion of the video is equal to the first number or equal to the size of video remaining if less than the first number.

(Continued)

Combined with pipelining, the approach achieves near-optimal throughput and fast bitrate adaptation, regardless of control plane algorithm.

16 Claims, 9 Drawing Sheets

(51) Int. Cl.
*H04L 29/06* (2006.01)
*H04L 29/08* (2006.01)
*H04N 21/44* (2011.01)
*H04N 21/858* (2011.01)
*H04N 21/442* (2011.01)
*H04L 12/801* (2013.01)
*H04N 21/24* (2011.01)
*H04N 21/6379* (2011.01)
*H04N 21/845* (2011.01)
*H04N 21/6373* (2011.01)
*H04L 12/807* (2013.01)
*H04N 21/2343* (2011.01)
*G06F 8/41* (2018.01)

(52) U.S. Cl.
CPC ............ *H04L 47/12* (2013.01); *H04L 47/27* (2013.01); *H04L 47/29* (2013.01); *H04L 65/4084* (2013.01); *H04L 65/601* (2013.01); *H04L 65/608* (2013.01); *H04L 67/02* (2013.01); *H04L 69/16* (2013.01); *H04N 21/23439* (2013.01); *H04N 21/2402* (2013.01); *H04N 21/44004* (2013.01); *H04N 21/44209* (2013.01); *H04N 21/6373* (2013.01); *H04N 21/6379* (2013.01); *H04N 21/8456* (2013.01); *H04N 21/8586* (2013.01); *H04L 43/0882* (2013.01); *H04L 43/0888* (2013.01); *H04L 43/0894* (2013.01); *H04L 43/16* (2013.01)

(58) Field of Classification Search
CPC ... H04L 65/608; H04L 65/4084; H04L 67/02; H04L 69/16; H04L 3/16; H04L 3/0882; H04L 3/0888; H04L 3/0894; H04N 21/2662; H04N 21/2402; H04N 21/23439; H04N 21/44004; H04N 21/44209; H04N 21/6373; H04N 21/6379; H04N 21/8456; H04N 21/8586
See application file for complete search history.

(56) References Cited

U.S. PATENT DOCUMENTS

2013/0282918 A1  10/2013  De Vleeschauwer et al.
2015/0236966 A1   8/2015  Francini et al.

OTHER PUBLICATIONS

International Preliminary Report on Patentability for International Application No. PCT/US2017/035126, entitled: "System and Method for Improving Streaming Video via Better Buffer Management", dated Dec. 4, 2018.

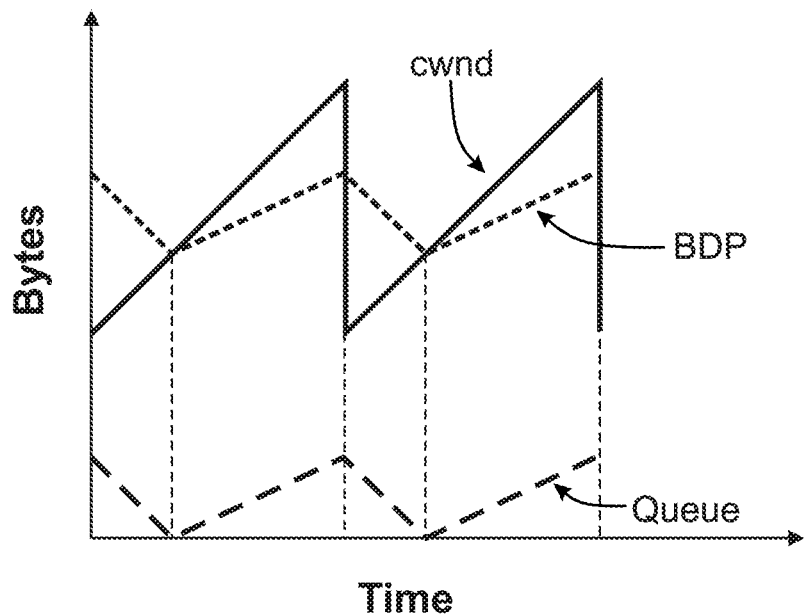
Fig. 1
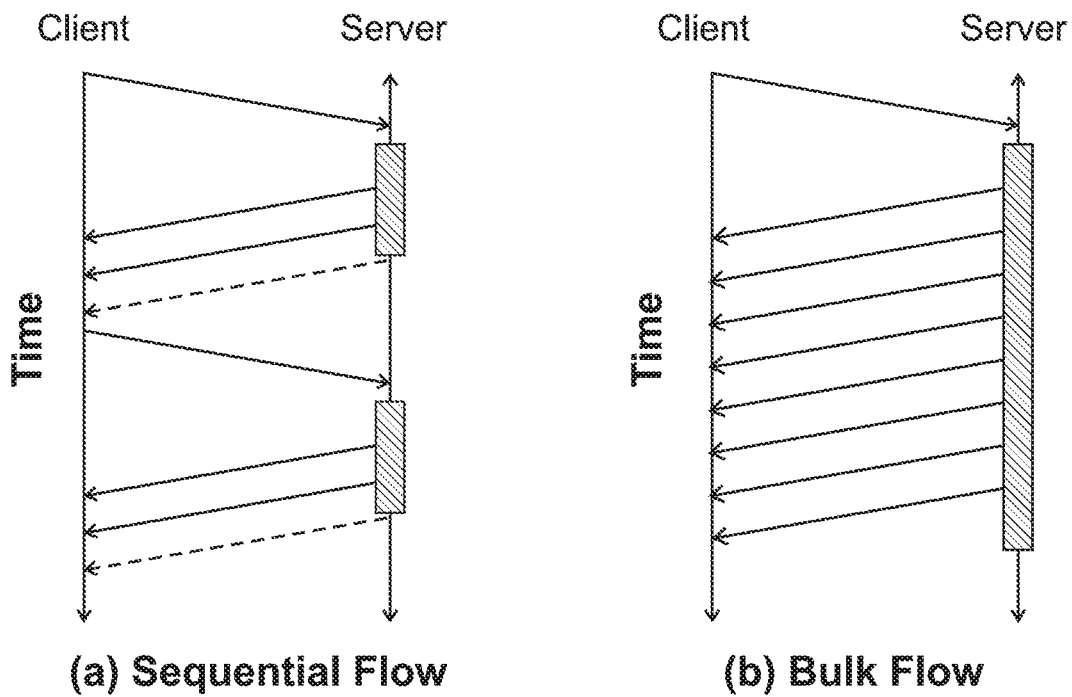
Fig. 2a
Fig. 2b

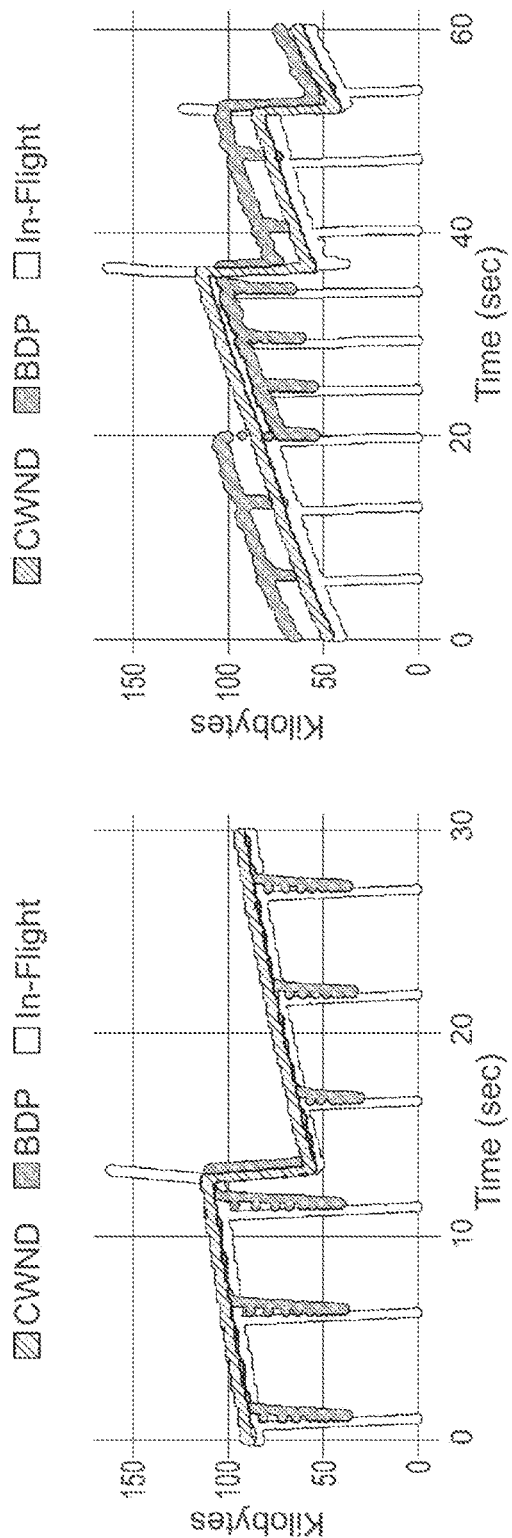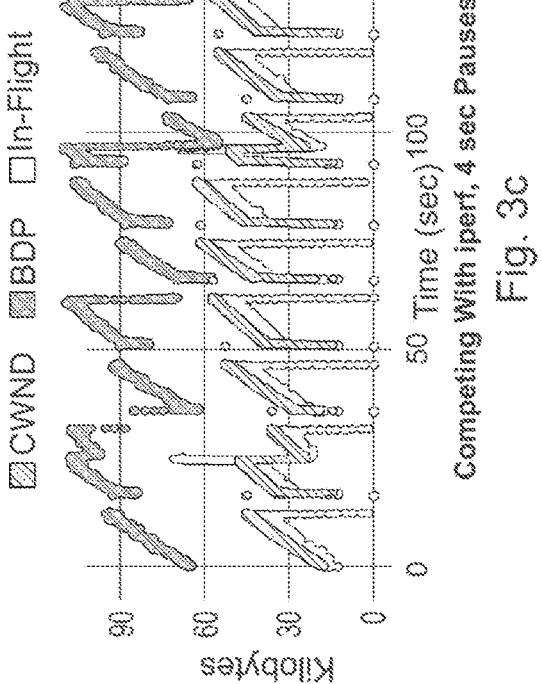

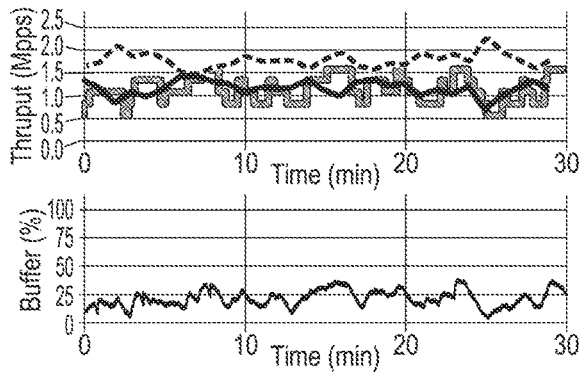
Fig. 8a DASH (79% fair share)
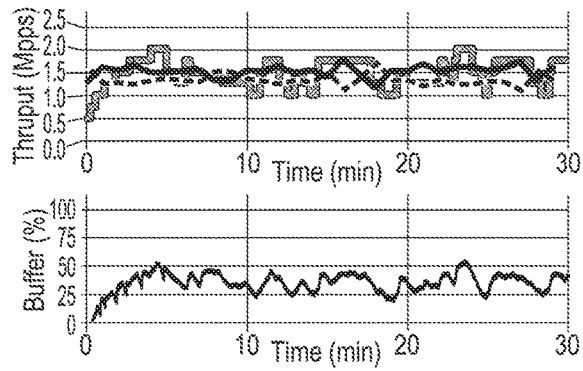
Fig. 8b Sprint (106% fair share)
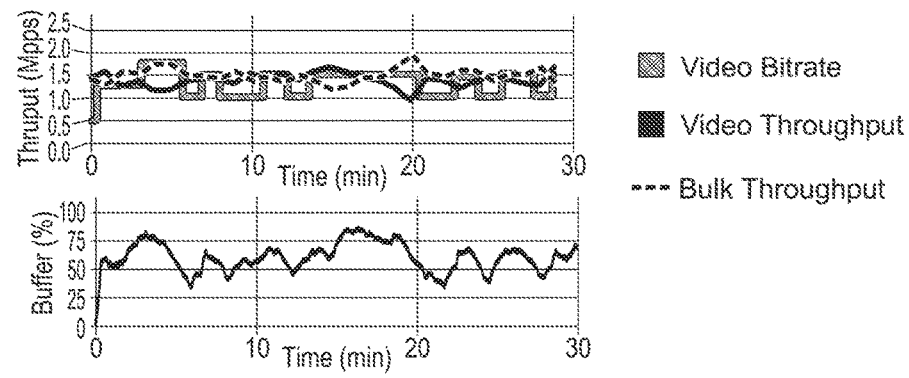
Fig. 8c Sprint-x (96% fair share)
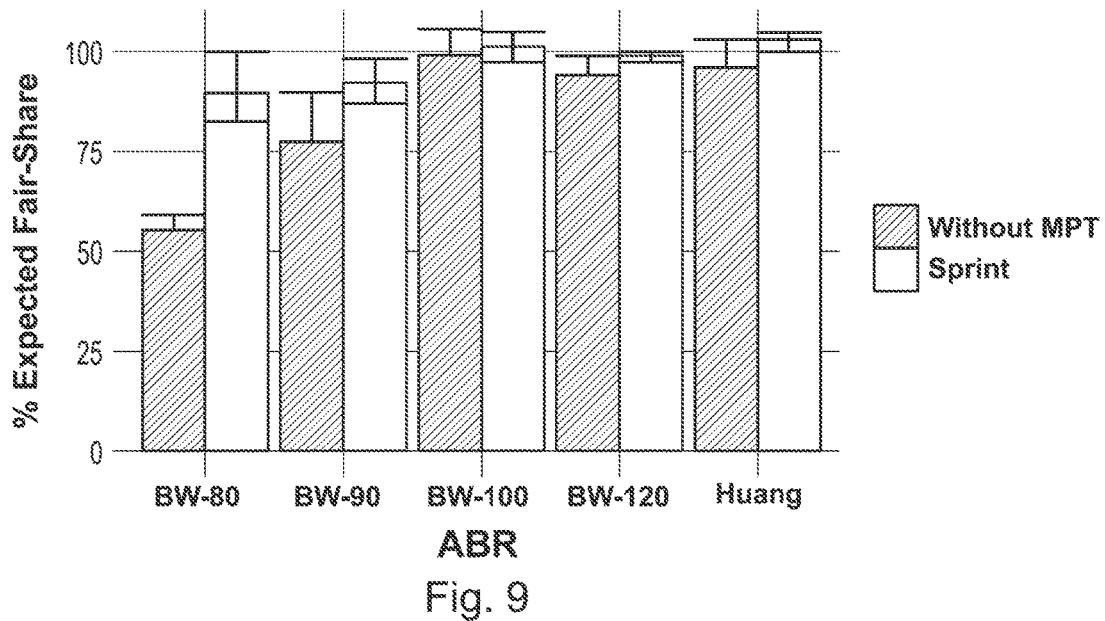
Fig. 9

SYSTEM AND METHOD FOR IMPROVING STREAMING VIDEO VIA BETTER BUFFER MANAGEMENT

RELATED APPLICATION

This application is the U.S. National Stage of International Application No. PCT/US2017/035126, filed May 31, 2017, which designates the U.S., is published in English, and claims the benefit of U.S. Provisional Application No. 62/343,279, filed on May 31, 2016. The entire teachings of the above applications are incorporated herein by reference.

GOVERNMENT SUPPORT

This invention was made with government support under Grant No. U.S. Pat. No. 1,250,990 awarded by the National Science Foundation. The government has certain rights in the invention.

BACKGROUND

HTTP-based video streaming is an important and widely-used application on the Internet today, comprising the majority of Internet traffic. Yet consumers remain dissatisfied with video quality, resulting in lost revenue for content providers. Recent studies have blamed the problems with video quality on the adaptive bitrate selection (ABR) algorithm used by many client video players, claiming that the ABR algorithm interacts poorly with TCP when a video buffer is full, which causes it to underestimate available network bandwidth.

SUMMARY

Disclosed herein are solutions that address a primary cause of problems with video streaming quality, which lie in the data plane. Even a perfect control plane (ABR) algorithm would not be enough to guarantee to video flows their fair share of network bandwidth. Namely, it is the sequential download of video segments that is at fault, as they disrupt the normal interaction between TCP congestion control and router queue occupancy. Disclosed herein is a careful modeling and characterization of the behavior of streaming video according to download size and network conditions, and the use thereof to develop an adaptive algorithm for optimally controlling download behavior. The disclosed approaches achieve near-optimal throughput and fast bitrate adaptation, regardless of control plane algorithms.

The disclosed approaches provide improvements to existing techniques for performing HTTP-based video streaming, where algorithms running on a video client (e.g., inside a browser) decide (a) how to select the resolution of a video chunk (referred to as "adaptive bit-rate" (ABR) encoding), and (b) how to download such video chunks (e.g., how many or how large segments to request, or how often to request them).

The disclosed approaches can be used to improve the quality of video streaming by, for example, allowing HTTP-based video streams (which is the vast majority of "over-to-top" video streams today) to consume a larger portion of the underlying network capacity, while still being "fair" with competing TCP flows. The disclosed approaches are immediately deployable today, with a relatively small number of changes to video players (and importantly, without requiring any changes to content delivery networks (CDNs) or origin video streaming/HTTP servers). The disclosed approaches can also be used to improve the quality of video streaming technologies that use an application-level protocol other than HTTP, provided that the application protocol uses a transport protocol with an adaptive control loop. Such a transport protocol includes TCP, which commonly uses a mechanism based on additive increase, multiplicative decrease (AIMD) for its adaptive congestion control.

According to one example embodiment, a method for improving video streaming performance of a video is employed in a system having a client machine and remote machine. The client machine determines a first number based on one or more parameters, where at least one of the parameters is related to current network conditions. A second number corresponding to a number of video segments of the video is determined by the client machine, where the number of video segments is calculated by a total size of the video segments, and where the second number is greater than or equal in size to a third number. The third number is determined based on at least a bandwidth-delay product of the network to the remote machine, and is no less than two. The client machine requests from the remote machine the second number of video segments in a pipelined fashion, wherein a subsequent request for a video segment of the video is made before a response to a prior request is at least partially received, provided that no less than the second number of video segments are outstanding at any one time. Another subsequent request is made if fewer than the second number of video segments are outstanding. Subsequent pipelined requests are stopped if a predetermined size of the video has been requested that is greater than or equal to the first number.

According to another example embodiment, a method for improving video streaming performance of a video is employed in a system having a client machine and remote machine. The client machine determines a first number based on one or more parameters, where at least one of the parameters is related to current network conditions. The client machine requests that the remote machine send a portion of the video, where the portion of the video has a size that is equal to the first number or equal to the size of video remaining if the size of the video remaining is less than the first number. The length of the requested video portion can be specified in a variety of ways, including in the requested URL, a URL query parameter, or an HTTP header (e.g., HTTP content-range header).

Another example embodiment is a machine-readable storage medium having stored thereon a computer program for improving video streaming performance of a video in a system having a client machine and remote machine. The computer program executes on the client machine and includes a routine of set instructions for causing the client machine to determine a first number based on one or more parameters, where at least one of the parameters is related to current network conditions. The instructions further cause the client machine to provide an estimate of network conditions for determining the first number, where the estimate of network conditions includes a network bandwidth or round-trip time to the remote machine. The instructions further cause the client machine to determine how to request video segments from the remote machine based on the first number.

Another example embodiment is an apparatus having improved video streaming performance and including a transceiver, memory, and at least one processor operatively connected to the memory and the transceiver. The at least one processor is operative to determine a first number based on one or more parameters, where at least one of the parameters is related to current network conditions. The at least one processor is further operative to either (a) determine a second number for which a number of video segments of the video, as calculated by a total size of the video segments, that is greater than or equal in size to a third number determined based on at least a bandwidth-delay product of the network to a remote machine, where the third number is no less than two, then request the second number of video segments from the remote machine in a pipelined fashion, and stop sending pipelined requests if a predetermined size of the video has been requested that is greater than or equal to the first number, or (b) request that the remote machine send a portion of the video, where the portion of the video has a size that is equal to the first number or equal to the size of video remaining if less than the first number.

In many embodiments, the video segment requests can occur via HTTP. The current network conditions can include, for example, an estimated bandwidth to the remote machine, an estimate of network latency, or an estimate of round-trip time to the remote machine. Determining the first number can be based on an underperformance parameter used to determine how close performance should be to an optimal value, or based on TCP estimates, where the TCP estimates include a number of round-trips or bytes transferred before TCP reaches a slow-start threshold or a bandwidth-delay-product.

In an example embodiment, the first number may be determined by determining an underperformance value, estimating a slow start threshold, calculating an initial number of network round-trips that occur between a beginning of a response and a slow start threshold, calculating a subsequent number of network round-trips that occur between the slow start threshold until a fair-bandwidth-delay product is reached, determining a total number of network round-trips based on the initial number of network round-trips, the subsequent number of network round-trips, and the underperformance value, and computing the first number based on the total number of network round-trips and the bandwidth-delay product.

The client machine can select a video bitrate, and then determines how to request video segments from the remote machine based on the first number and the video bitrate. The client machine may select a bitrate based on one or more network conditions, and may use an adaptive bit rate algorithm to select a bitrate for outstanding video segments. The client machine may select the video bitrate based on a level of a video buffer, where the bitrate is increased if the video buffer level increases to or by a first specified amount, and where the bitrate is decreased if the video buffer level decreases to or by a second specified amount. The first and/or second specified amount may be levels corresponding to total amounts of data in the video buffer or percentages of the total size of the video buffer. Alternatively, the first and/or second specified amounts may correspond to amounts or rates by which the levels have changed.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1 is a schematic diagram illustrating TCP dynamics.

FIGS. 2a and 2b are schematic diagrams illustrating sequential vs. bulk flows. The last packet of each request in the sequential flow (shown as a dashed line) empties the network queues of that flow.

FIGS. 3a-c are graphs illustrating example cwnd, fair-BDP, and number of in-flight bytes of three video flows. For all graphs, the fair share of network bandwidth is 2 Mbps, propagation delay is 20 ms, router queue size is 100 KB, and video segment size is 1250 KB. Fair-BDP is calculated using TCP's estimate of RTT and the fair-share bandwidth.

FIGS. 8a-c are graphs illustrating example aggregate throughput (solid lines) and video buffer levels of DASH, Sprint, and Sprint-x. In each experiment, the video flow shares a 3 Mbps bottleneck link with a bulk file download (dashed lines).

FIG. 9 is a graph illustrating example median fair share achieved by Sprint while using different ABR algorithms across five 25-minute runs (error bars show minimum and maximum). This is compared to Sprint when the minimum pipeline train (MPT) is not enforced. The BW-x ABR algorithms set the video bitrate to x % of the measured throughput.

DETAILED DESCRIPTION

Figure 4:
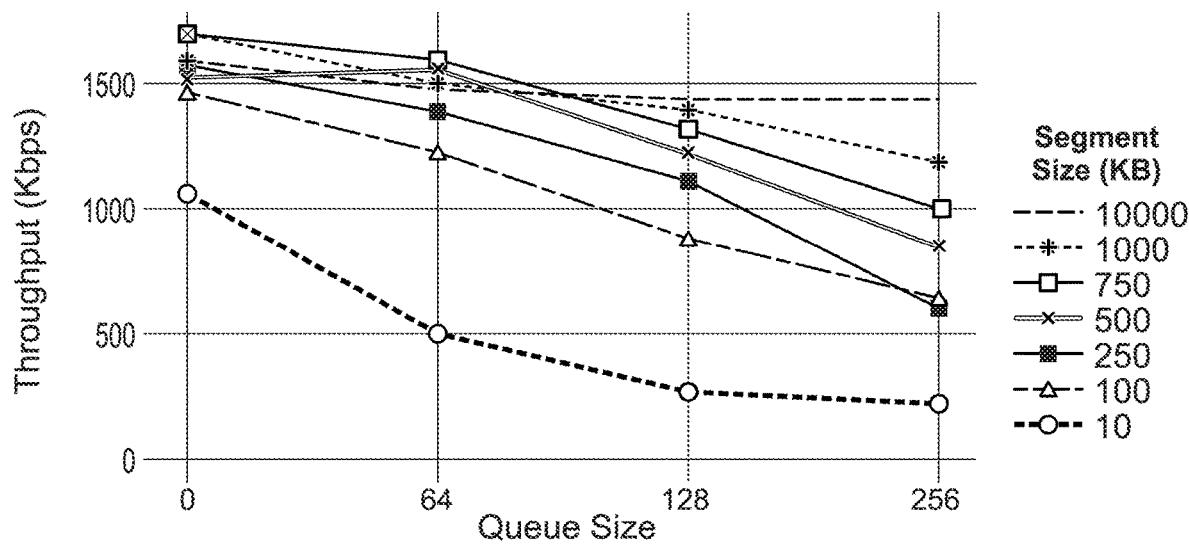
FIG. 4 is a graph illustrating example throughput of video flow performing sequential downloads (without pauses) as segment size varies, while competing with an iperf flow. The fair share of network bandwidth is 1500 Kbps.

A description of example embodiments follows.

The teachings of all patents, published applications and references cited herein are incorporated by reference in their entirety.

The disclosed systems and methods address important problems: video is the main source of traffic on the Internet today, comprising a whopping 78% of total North American traffic and expected to grow to 84% by 2018. Video over HTTP is the dominant form of video consumption, mainly because it is easy to deploy and allows content providers to reuse existing infrastructure for content distribution. Netflix, YouTube, and Amazon Video all use this form of streaming, and account for more than 50% of all peak downstream North American Internet traffic. Yet poor video quality remains a problem, with 58.4% of video views impacted by poor performance in 2014. The disclosed approaches address these problems.

All common standards of HTTP-based video streaming (including proprietary ones from Apple, Microsoft, and Adobe, and the open-source Dynamic Adaptive Streaming over HTTP (DASH) standard) use the same underlying technique. Movies are divided into segments of a given duration (e.g., 4 seconds of video), and each segment is encoded at multiple pre-set bitrates: higher bitrates result in larger, higher-quality segments. These segments are served as static content from a regular web server or cache. The video player on the client determines when to download the next segment and at what bitrate.

Prior work has shown that video flows are unable to achieve their fair share of available bandwidth when competing against other flows. This is a common scenario: shared downlinks are characteristic of both residential Internet connections and mobile networks, with an average of 1.5 devices per household streaming video concurrently during prime-time in 2014. Several recent studies have attributed this problem to TCP congestion window sizing, and have in response proposed techniques to ensure a minimum download size in order to allow the TCP congestion window to grow (and fill up network buffers).

Careful consideration and mathematical modeling of TCP dynamics disclosed herein shows that these previous works did not actually identify the root cause of the problem, and thus led to proposed solutions that are either incomplete or suboptimal in some way. The disclosed approaches employ a new "data plane" solution based on ensuring a minimum download size of video data. Unlike prior approaches, knowledge of the root cause is employed herein to analytically derive the minimum download size required as a function of current network conditions in order to achieve a $1-\epsilon$ fraction of a video flow's fair share throughput.

Two example embodiments of the disclosed systems and methods are disclosed herein: one uses expanded range requests and can run inside a regular web page (referred to herein as "Sprint-x"); the other uses pipelined requests and can run as a browser extension (referred to herein as "Sprint") due to limitations in current browser APIs (e.g., APIs exposed to code, such as javascript, received as web content), which is also addressed. Both example embodiments may appear algorithmically simple on the surface, but right-sizing the downloads is critical to their efficiency, which in turn relies on a correct understanding of the problem. These embodiments are meant only to be illustrative of the use of the disclosed approaches, and not in a limiting fashion.

Evaluation provided herein shows that the disclosed solutions achieve large gains in throughput across a variety of control plane algorithms. In effect, Sprint allows the control plane to focus on high-level objectives such as quality of experience (QoE), while trusting the data plane to execute its decisions efficiently. While one example embodiment, Sprint, may not be readily implemented in current browser APIs, it can be implemented either with browser changes (e.g., by Apple for Safari, Microsoft for IE/Edge, or Google for Chrome), or as a browser plugin. Many industry players in the video streaming market (e.g., Adobe, Apple, Microsoft) already provide for browser plugins. Further, the issue with browser APIs does not affect non-browser players, such as set-top boxes, DVRs, smart TVs, video-gaming consoles, media centers, etc., and it will be understood by one of ordinary skill in the art that these current browser API limitations are not fundamental, and that changes to browser APIs can allow Sprint to be readily implemented in the browser via javascript or some other high-level programming language.

The disclosed approaches have meaningful performance improvements over existing technology vis-à-vis the means by which it can achieve high utilization of shared/congested network links, leading to a better video streaming experience. The disclosed approaches can be employed, among other ways, by CDNs (e.g., Akamai, Limelight, Mirror Image); entities employing video streaming browser technology (e.g., Adobe Flash, Microsoft SilverLight, Apple SmoothStreaming); companies that have built their own CDNs (e.g., Google/YouTube, Facebook, Amazon Video, Netflix); video distribution platforms (e.g., Ooyala, The Platform, BrightCove); white-label CDN infrastructure providers (e.g., Velocix (now Nokia), EdgeCast (now Verizon), Tata, Cisco); and ISPs (e.g., Layer 3, AT&T, Comcast).

The following description, organized into sections 1-8, explains these approaches and the details of the problems they solve.

1. INTRODUCTION

Video is the main source of traffic on the Internet today, yet poor video quality remains a source of dissatisfaction for customers and lost revenue for content providers. Video streaming over HTTP is the dominant form of video consumption as it is easy to deploy and allows content providers to reuse existing infrastructure for content distribution. There are several standards for HTTP-based video streaming, but all use the same underlying technique. Movies are divided into segments of a given duration (e.g., 4 seconds of video), and each segment is encoded at multiple pre-set bitrates: higher bitrates result in larger, higher-quality segments. These segments are served as static content from a regular web server or cache. The video player on the client determines when to download the next segment and at what bitrate.

We can divide a video player's functionality into a control plane and a data plane. The control plane chooses when to download the next segment and uses adaptive bitrate selection (ABR) to choose the segment's bitrate; it maintains the downloaded segments in a buffer. The data plane downloads each segment via an HTTP request. Typically, the ABR algorithm selects a bitrate that is just under the link bandwidth estimated using timing data from the previous downloads. As long as the video buffer is below the target level, segments are downloaded sequentially (one at a time). When the buffer fills, downloads are paused until the buffer drains below a certain watermark. The ABR algorithm has to walk a tightrope: if it selects a bitrate that is too high, the download may not keep up with video playback, resulting in interruptions; if the bitrate is too low, video quality and user satisfaction suffer. Ultimately, the goal is to pick a bitrate that matches the available network bandwidth.

Prior work has shown that video flows are unable to achieve their fair share of available bandwidth when competing against other flows. This is a common scenario: shared downlinks are characteristic of both residential Internet connections and mobile networks, with an average of 1.5 devices per household streaming video concurrently during prime-time in 2014. This number is up 28% since 2012, and represents a lower bound on the number of competing flows.

In a recent study, Huang et al. (T.-Y. Huang, N. Handigol, B. Heller, N. McKeown, and R. Johari. "Confused, timid, and unstable: Picking a video streaming rate is hard." In *IMC*, 2012, referred to hereinafter as "Huang") attributed the problem to two things: (i) when the video buffer is full, the pauses between segment downloads cause TCP to time out and reset the congestion window ("cwnd"), and (ii) lower cwnd values cause the ABR algorithm to underestimate the available bandwidth, leading it to select lower bitrates (smaller segments) that further stymie the growth of cwnd, creating a negative feedback loop. Not surprisingly, the proposed solutions have included alternative ABR algorithms—e.g., Huang's algorithm avoids filling the video buffer—and techniques that ensure a minimum download size to allow cwnd to grow. This prior work, however, did not identify the root cause of the problem, and hence the prior solutions, while providing an improvement, are incomplete or suboptimal in some way.

We first review some TCP basics and establish a connection between a flow's cwnd and the bandwidth-delay product (BDP) (Section 2.2). Since competing flows increase the perceived round-trip time by filling router queues with their packets, they increase BDP. This combined with the sequential nature of video segment downloads—which repeatedly drains the router queues of a flow's packets—is what leads to suboptimal throughput (Section 3). In particular, this is a data plane problem that occurs even when the video buffer is not full, so it affects all control plane algorithms, including those of Huang. By addressing the problem, we can improve the performance of all control planes simultaneously.

Armed with this insight, we devise a data plane solution based on ensuring a minimum download size of video data (Section 4). Unlike prior solutions that take this approach, we use our knowledge of the root cause to analytically derive the minimum download size required, as a function of current network conditions, in order to achieve a 1−ϵ fraction of the video flow's fair-share throughput.

We describe two implementations of our solution: one uses expanded range requests and runs inside a regular web page (Sprint-x); the other uses pipelined requests and runs as a browser extension (Sprint) due to limitations in current browser APIs, which we also address (Section 5). Both solutions are very simple on the surface, but rightsizing the downloads is critical to their efficiency, which in turn relies on a correct understanding of the problem. Our evaluation (Section 7) shows that these simple solutions achieve big gains in throughput across a variety of control plane algorithms. In effect, Sprint allows the control plane to focus on high-level objectives such as quality of experience (QoE), while trusting the data plane to execute its decisions efficiently.

To summarize, we make the following contributions to reach the solutions disclosed herein:
  We divide video streaming into a control plane and a data plane and identify the root cause of network underutilization: sequential downloads disrupting the normal interaction between TCP congestion control and router queue occupancy.
  We develop a model to explain the throughput of video flows as a function of download size and current network conditions. We use this to define an algorithm that adaptively determines the download size needed to achieve 1−ϵ fraction of the fair-share bandwidth.
  We implement our solution, Sprint, as a DASH video player and evaluate it in emulated and real environments against state-of-the-art proposals and commercial players. We evaluate Sprint's universality by applying it to several different control plane algorithms. We also suggest an extension to the browser API that enables efficient video streaming within a web page.

2. BACKGROUND

We first summarize prior efforts to explain the underperformance of video flows. Then, we describe an analytical framework for diagnosing problems in the data plane.

2.1. Related Work

Prior work has studied why video flows achieve less than their fair share of network throughput, when there are no competing flows, with competing video flows, and with competing bulk flows. Some of this work attributes the unfairness to the repeated pauses that occur when the video buffer is full, and also identifies the negative feedback loop that can occur when switching to a lower bitrate.

Two main classes of solutions have been proposed to address video streaming unfairness. The first has been to modify the ABR algorithm, which controls when to request the next video segment and at what bitrate. Huang minimizes the effect of pauses by avoiding filling the buffer and picking bitrates more accurately. Jiang et al. (J. Jiang, V. Sekar, and H. Zhang. Improving fairness, efficiency, and stability in http-based adaptive video streaming with festive. In *CoNext*, 2012) reduce unfairness between video flows by being cognizant of the fact that higher bitrate flows sense more bandwidth than lower bitrate flows. These solutions reside in the control plane, and hence are unable to address inefficiencies inherent to the data plane.

The second approach enforces fair bandwidth allocations via on-path network elements, either at the home router or the content provider. These data plane solutions are hard to deploy and do not directly address the underlying problems we uncover.

Huang advocates downloading larger chunks of video data, which is similar to the approach we take. However, they propose it as a one-size-fits-all solution to improve bandwidth estimates. In contrast, we derive the download size analytically as a function of network conditions, and develop data plane mechanisms that allow the ABR algorithm to adapt the bitrate quickly.

There is a vast body of work on improving QoE metrics (e.g., startup delay, rebuffering events, etc.) for video streaming, but they concern the control plane and is, therefore, complementary to the solutions disclosed herein.

2.2. TCP Throughput Basics

In order to understand what goes wrong in the data plane of video flows, we need to review some TCP basics. Recall that TCP limits the number of unacknowledged bytes sent on the network to the congestion window (cwnd). Since an acknowledgment takes a round-trip time (RTT) to arrive, this limits the flow's throughput to cwnd/RTT. Equivalently, to support a throughput of T, cwnd must exceed T×RTT bytes, the familiar bandwidth-delay product (BDP). When multiple flows share a bottleneck link, the cwnd of each flow has to exceed the fair-BDP—the fair share of the link bandwidth multiplied by RTT. (For simplicity, we use BDP and fair-BDP interchangeably.) It is critical to note that RTT is a dynamic quantity because it includes queuing delays in the network (in addition to propagation delays). Consequently, BDP is also dynamic: it rises and falls as network queues fill and drain (see FIG. 1). These fluctuations can be large: a 3 Mbps link with a 256 KB queue (representative of US home connections as per our analysis in Section 7.4) can take 683 ms to drain in the worst case. If RTT without queuing is 100 ms, for example, BDP could grow by 583%.

TCP flows do not rely on cwnd always exceeding BDP to get their fair share of network throughput. Instead, in-network queues absorb the peaks and troughs of TCP's famous cwnd saw-tooth pattern. FIG. 1 shows the interaction between cwnd and in-network queuing. When cwnd exceeds BDP, the sender is transmitting more bytes than the bottleneck link can drain, so network queues start growing. Eventually, the queues fill to capacity and packets are dropped, causing cwnd to get cut in half (TCP's congestion avoidance). At this point cwnd might be less than BDP, but since the bottleneck queue is full, it can supply data to the link so no throughput is lost. If the queue is sized appropriately, it will finish draining just as cwnd again exceeds BDP.

This leads us to the following observations which, while not novel, are critical for understanding the problems with today's video flows: Observation 1–BDP is a dynamic quantity that rises and falls as network queues fill and drain; and Observation 2—To fully utilize network bandwidth, either cwnd >BDP or network queues must not be empty. As we will see, video flows tend to violate Observation 2, leading to poor throughput.

3. EXPLAINING POOR VIDEO PERFORMANCE

Given the above, we now explain video flow performance and re-characterize some of the conclusions made by prior work. There are three scenarios of interest for a video flow: (i) no competing flows, (ii) competing against a bulk flow with pauses between requests, and (iii) competing against a bulk flow without pauses between requests.

Prior work has focused on the first two scenarios. Most notably, Huang showed that video flows underestimate their fair share of bandwidth when competing against bulk flows, causing the video player to choose a lower bitrate than necessary. They attributed the problem to the periodic pauses that occur when the video buffer is full: the player alternates between downloading video segments to fill the buffer, and pausing while the buffer drains due to video playback. Huang showed that during a pause, cwnd times out and collapses to its initial value (10 packets). Since the competing bulk flow continues to fill the network queues, the video flow experiences high packet loss when it resumes downloading, causing cwnd to get "repeatedly beaten down." They did not observe this effect when there was no competing flow.

Our model of TCP throughput gives an analytical framework for understanding the effects observed by Huang. Moreover, we discover that the underlying problem occurs even when there are no pauses in downloading. This is the case while the video buffer is filling and in general when the fair share of bandwidth is below the chosen video bitrate. According to Akamai's State of the Internet Report for Q4 2014, this is common for high quality video: only 18% of network flows in the United States have an average speed above the 15 Mbps bitrate characteristic of 4K video.

The following explains three scenarios:

(i) No competing flows. Without any competing flows, there is no queuing delay in the network, so BDP remains lower than cwnd. This satisfies Observation 2. Even if a pause occurs and cwnd drops to its initial value, this is still often higher than BDP. For example, in Huang's experiment setup, the BDP of a 5 Mbps link with no queuing delay is 100 kbits, while the initial cwnd is 117 kbits. This explains why they observed good performance when there were no competing flows.

(ii) Competing against a bulk flow with pauses between requests. Competing flows induce a queuing delay, and thus raise BDP during a pause in the video flow. As we observed earlier, this increase can be dramatic. When the video flow resumes downloading, its initial cwnd of 10 packets falls below the current BDP; meanwhile, the preceding pause has drained all video packets violate Observation 2, resulting in suboptimal throughput. This explanation is the same as Huang's.

(iii) Competing against a bulk flow without pauses between requests. Even without pauses, the video player still periodically drains the network queues of all video packets. This is because it downloads the video segments sequentially using HTTP requests. FIG. 2 illustrates the difference between this sequential flow and a bulk flow. The video player waits to receive the last packet of the previous request (shown in red) before issuing the next request. The act of receiving this packet drains the network queues of all video packets, as the video server has no more data to send until it receives the next request. If cwnd is below BDP at this time—e.g., right after it halves during congestion avoidance, as shown in FIG. 1—then Observation 2 will be violated and the flow will achieve suboptimal throughput.

Prior work has shown that when video flows achieve less than their fair share of throughput, this results in a negative feedback loop: lower throughput causes the video player's ABR algorithm to switch to a lower bitrate; lower bitrate segments are smaller (for the same number of video seconds), so less data is downloaded and cwnd grows less; and lower cwnd values exacerbate the problems above. Although this was previously observed for the second scenario above, it also holds for the third scenario we are newly observing.

There are two possible reasons why Huang did not encounter the third scenario in their studies. The first is that they used a queue size that is too small: e.g., 15 KB in one study. Indeed, if the bottleneck queue size is small, then BDP may not increase enough to violate Observation 2 and the problem mostly goes away. However, our analysis of FCC data (Section 7.4) indicates that the majority of US home connections have bottleneck queues larger than 128 KB; further, bufferbloat is a problem that is not going away anytime soon. The second reason is that Huang addressed a control plane problem, and so their evaluation focused on QoE metrics, not network throughput.

3.1. Empirical Validation

Using traces of actual network transfers, we can validate our explanations of video performance. FIGS. 3a-c traces a video flow in each of the three scenarios above. We used the TCP probe Linux kernel module to obtain internal TCP information during the actual data transfers, in a controlled network environment in our lab.

When there are no competing flows (FIG. 3a), the video flow does not encounter any problems because cwnd stays above BDP the whole time. The situation is starkly different when competing against a bulk flow with pauses (FIG. 3c). Here, cwnd times out repeatedly due to the pauses and never even reaches fair-BDP; consequently, it is unable to build up any router queue occupancy. This violation of Observation 2 leads to very poor throughput.

FIG. 3b shows the new scenario we uncover, where there is a competing flow but no pauses in downloading. Though not as pronounced as the previous scenario, we still see repeated violations of Observation 2: cwnd falls below fair-BDP at the same time the router queues are emptied of all video packets. This happens at the boundary of video segment downloads: the end of the previous download drains the router queues of all video data (inflight packets drops to zero), while the queuing delay induced by the competing flow prevents fair-BDP from falling as much as it did without a competing flow. Together, these factors make it likely that, at the start of a next segment download, cwnd is below fair-BDP. This is exactly what happens at seconds 5, 11, 40, 48 and 53. Thus even without pauses, the sequential nature of video downloads can lead to suboptimal throughput. Our evaluation shows that this degradation can be severe in practice, especially for industry video players (FIGS. 7a-d).

Finally, we validate our claim that the negative feedback loop observed by prior work applies even without pauses. FIG. 4 shows the throughput of sequential video downloads as segment size (bitrate) decreases. Clearly, as the ABR algorithm selects lower bitrates, performance will continue to spiral downwards.

3.2. Towards a Solution

Previous work proposed changes to the ABR algorithm to deal with the problem of pauses when the video buffer fills. For example, Huang's algorithm chooses the bitrate based on the current buffer level, and thus avoids filling it unless the available bandwidth supports downloading at the maximum bitrate.

In contrast, the problem of sequential video downloads exists even in the complete absence of pauses, and therefore cannot be resolved by changes in the control plane. Instead, we must change the way segments are downloaded in the data plane. The next section develops our data plane solution, which we call Sprint. Table 1 shows the relationship between Sprint and a sample ABR solution such as Huang's.

TABLE 1

The combinations of data plane and ABR algorithms that allow a video to fully utilize available bandwidth. BW represents the fair share of network bandwidth and VBR is the video bitrate.

| Data Plane | ABR | BW < max (VBR) | BW > max (VBR) |
|---|---|---|---|
| DASH | Default | No | No |
| DASH | Huang | No | Yes |
| Sprint | Default | Yes | Yes |
| Sprint | Huang | Yes | Yes |

When the available bandwidth is less than the maximum video bitrate, Huang's solution improves video performance by avoiding pauses, but fails to achieve its full fair-share bandwidth due to the sequential download problem. Yet when the available bandwidth exceeds the maximum bitrate, their solution is sufficient: it prevents the negative feedback loop that occurs with standard ABR algorithms, and the excess bandwidth in the network masks the data plane issues caused by sequential downloads. Sprint, on the other hand, enables video flows to achieve their fair share of throughput in all network scenarios, regardless of the ABR algorithm used. Indeed, being a data plane solution, Sprint can be viewed as complementary to prior work.

4. FIXING VIDEO PERFORMANCE

Based on the above analysis, we propose fixing video performance by using a new data plane that avoids the interruptions caused by sequential downloads. We achieve this by increasing the amount of data that is downloaded as a continuous stream; we call this unit of data a chunk. A chunk that spans multiple video segments allows cwnd to grow and avoids draining the network queues between segment downloads, satisfying Observation 2. In order to use chunks effectively, we need to determine how big to make them, while still allowing the video player to adapt the bitrate as available bandwidth changes. We begin by ruling out some straw men. One approach is to download the entire video as a single chunk. This results in high throughput (the video flow looks like a bulk flow), but it prevents the player from adapting the bitrate to the available bandwidth. In addition, since many users abandon videos before finishing them, content providers do not want to send video too far ahead of the current playback position.

Another approach is to create the semblance of a large chunk by multiplexing individual segment downloads across multiple (sub)flows. Doing this efficiently requires a scheme such as multipath TCP, which links congestion control across multiple subflows while using the fair share of a single TCP flow. Besides the deployment barrier, this solution is also probabilistic, and hence requires many subflows to work. For example, we used the htsim simulator to test a video flow on a bottleneck link with 2 Mbps fair-share bandwidth and 128 KB queue size, and even with 16 subflows the achieved throughput was only 1.90 Mbps—up from 1.14 Mbps with one subflow, but still shy of the fair share.

Instead, we solve the problem adaptively within a single TCP flow. We first present an algorithm that determines the minimum chunk size necessary to achieve fair-share throughput (Section 4.1). Then, we devise two implementations that make critical use of this algorithm while allowing the control plane to adapt the bitrate quickly (Section 4.2).

4.1. Adaptive Chunk Sizing

To determine the appropriate size for a video chunk, we first quantify the relationship between chunk size and network throughput, drawing from our analysis in Section 3. We use this to derive an expression for the minimum chunk size needed to achieve a $1-\epsilon$ fraction of the fair share throughput.

Relating chunk size to network throughput—We define the efficiency of a chunk transfer as the ratio between the achieved throughput and the fair-share throughput, given the current network conditions.

To estimate the achieved throughput, we estimate the number of round-trips required to transfer the chunk. There are three phases in the transfer:

Phase 1—Slow start. From the beginning of the transfer to the slow start threshold (SST), the number of bytes transferred doubles every round-trip. Given an initial cwnd of 10 packets and the MSS, 10×MSS bytes are transferred in the round-trip. Therefore, the number of rounds in this phase is:

$$r_1 = \lceil \log_2(SST/(10 \times MSS)) \rceil + 1$$

and via a geometric series the total bytes transferred is:

$$b_1 = (10 \times MSS)(2^{r_1} - 1)$$

Phase 2—Additive increase. From the slow start threshold until cwnd reaches fair-BDP (denoted $BDP_f$), cwnd increases by one MSS every RTT. Thus, the number of rounds is:

$$r_2 = \lfloor (BDP_f - SST)/MSS \rfloor + 1$$

and the total bytes transferred is:

$$b_2 = r_2 \times SST + MSS(r_2 - 1)$$

Phase 3—Transfer at BDP. For the rest of the transfer, the bytes transferred per round-trip is equal to fair-BDP. Assuming a chunk size of S, the number of rounds is:

$$r_3 = \lceil (S - (b_1 + b_2))/BDP_f \rceil$$

The total number of rounds is then $r = r_1 + r_2 + r_3$, and the average throughput per RTT is S/r. Since the fair-share throughput per RTT is simply fair-BDP, the efficiency of the chunk transfer is:

$$E = S/(r \times BDP_f)$$

This analysis shows that smaller chunks transfer at lower efficiency because the fraction of time spent in the first two phases (before cwnd reaches fair-BDP) is higher. On the flipside, keeping chunk size constant, the efficiency of the transfer decreases as fair-BDP increases because it takes longer for the cwnd to reach it ($r_1$ and $r_2$ increase).

Figure 5:
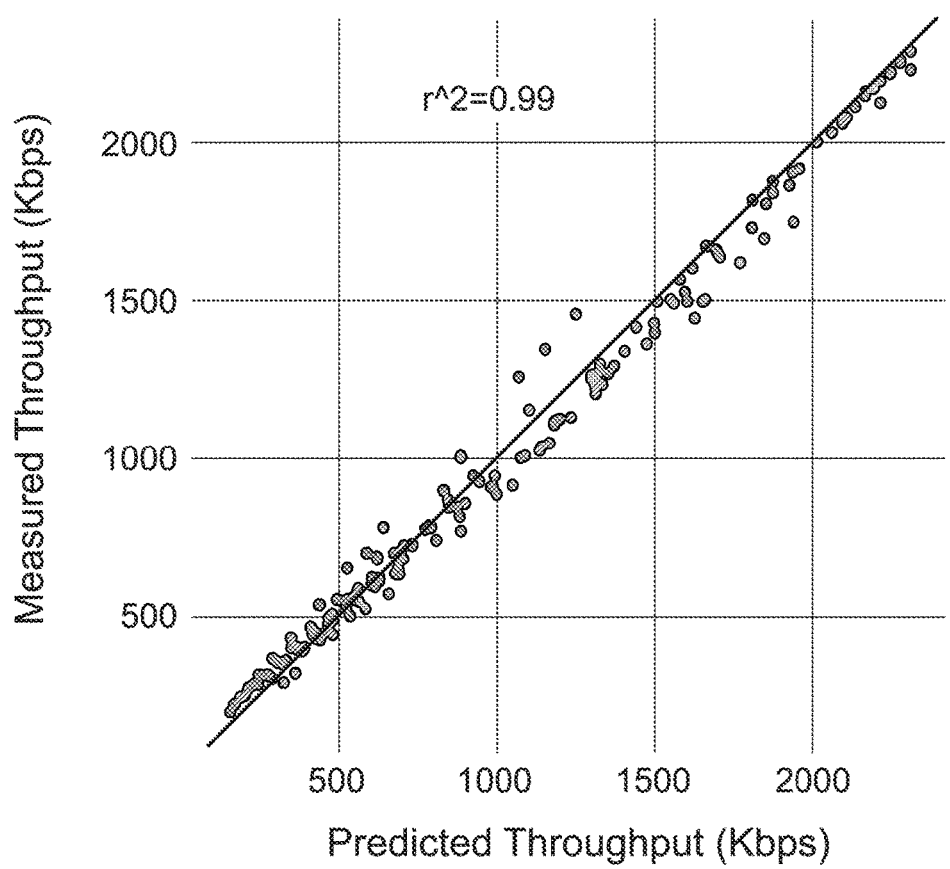
FIG. 5 is a graph illustrating example predicted vs. measured throughput for video chunk downloads over a bottleneck link with bandwidth 2.5 Mbps, queue size of either 250 KB or 31 KB, and propagation delay ranging from 100-1000 ms. Chunk sizes ranged from 117-1800 KB.

To validate the equation, we use it to predict the throughput of real chunk transfers. FIG. 5 shows that the prediction is accurate across a wide range of chunk sizes and bottleneck queue sizes. The prediction takes as input the measured average slow-start threshold, chunk size, and bottleneck link bandwidth. Each data point is an average of 10 chunk transfers.

Deriving the minimum chunk size—We use the equation to determine the chunk size large enough to ensure an efficiency of 1−ϵ, for any ϵ. This ensures the video flow achieves at least 1−ϵ fraction of its fair-share throughput.

The equation can be rewritten as:

$$E = \frac{S}{r \times BDP_f} = \frac{S}{(r_1 + r_2 + r_3)BDP_f}$$

If we bound $(r_1 + r_2)/(r_1 + r_2 + r_3) \leq \epsilon$ we get:

$$1 - \epsilon \leq \frac{r_3}{r_1 + r_2 + r_3} = \frac{r_3 BDP_f}{(r_1 + r_2 + r_3)BDP_f}$$

Since $r_3 BDP_f = S - (b_1 + b_2)$, which is less than S, $$1 - \epsilon < \frac{S}{(r_1 + r_2 + r_3)BDP_f} = E$$

Thus, if we set $r = (r_1 + r_2)/\epsilon$, then the efficiency has to be greater than 1−ϵ. Intuitively, we bound the number of round-trips during which throughput underperforms ($r_1 + r_2$) to a small fraction (ϵ) of the overall transfer (r).

The following Program shows an algorithm for selecting the chunk size of a video transfer, based on the derivation above. The getChunkSize function takes as input an estimate of the current bandwidth and RTT, as well as the desired ϵ. It computes $r_1$ and $r_2$ using the earlier equations and sets $r = (r_1 + r_2)/\epsilon$ as prescribed above. It then uses the equation to determine the chunk size. Note that the values for $r_1$ and $r_2$ are conservative because they assume cwnd drops to its initial value between chunk requests. Likewise, the algorithm estimates the slow-start threshold at ¾ of fair-BDP instead of ¾ the maximum cwnd seen as per TCP's specification.

Program: Example code for determining the right chunk size to download in video streaming.

```
getChunkSize(bandwidth, rtt, eps) {
  bdp = bandwidth * rtt
  sst = bdp * (3/4)
  r_1 = rtsToSST(sst)
  r_2 = rtsFromSSTtoBDP(sst, bdp)
  totalRts = (r_1 + r_2) / eps
  chunkSize = (1 - eps)* (totalRts * bdp)
  return chunkSize
}
rtsToSST(sst) {
  cwndStart = (10 * MSS)
  if (sst < cwndStart)
    return 1
  rounds = Log2(sst, cwndStart)
  return ceil(rounds) + 1
}
rtsFromSSTtoBDP(sst, bdp) {
  // cwnd has to expand during additive incr
  byteToBDP = bdp − sst
  return bytesToBDP / MSS + 1
}
```

It is important to note that there is no interaction between Program 1 and the ABR algorithm choosing the bitrate. A chunk may contain multiple video segments of any bitrate or even a mixture of multiple bitrates. The data plane simply ensures that enough segments are continuously downloaded to meet the minimum chunk size, as discussed next.

4.2. Two Data Plane Implementations

The above Program provides the right chunk size to use, but does not tell us how to download this amount of data. We describe two simple data plane mechanisms for performing the actual downloads. The first, called Sprint, pipelines multiple video segment requests together to comprise a larger (chunk-sized) download. The second, called Sprint-x, issues a single range request that spans enough video data to meet the chunk size. Both mechanisms allow the video player to adapt the bitrate in the middle of a chunk, and both use the minimum chunk size to ensure the video flow achieves its fair-share throughput. However, whereas Sprint achieves these goals simultaneously, Sprint-x imposes a tradeoff between bitrate adaptation and throughput. On the flipside, Sprint is not readily implementable using standard web browser APIs (as discussed in Section 5), and hence must be deployed as a browser extension.

4.2.1. Sprint: Pipelined Requests

Our first mechanism uses HTTP pipelining to string multiple video segment requests together. By structuring this pipeline carefully, we can ensure the video server is never stuck waiting for an HTTP request, while the ABR algorithm can still change bitrate in the middle of a chunk.

We refer to the segment requests belonging to the same chunk as a train; the size of the train is exactly the chunk size from Program 1. Clearly, if we pipeline a train all at once, the ABR algorithm will not be able to change bitrates in the middle of a chunk. This is a problem because the chunk size may be quite large. Instead, we pipeline the requests incrementally, by limiting the number of outstanding requests in the network. As soon as a request completes (reducing the outstanding requests by one), a new segment can be requested. This continues until the entire train has been issued.

In order to set the number of outstanding requests, we observe that we only need enough of them to ensure the video server is not idly waiting in the middle of a chunk. Thus, we set this number to generate a response of at least BDP bytes (but enforce a minimum of two to avoid sequential downloads). Although the ABR algorithm cannot change the bitrate of outstanding requests, in practice only a few are needed and they also complete within an RTT—e.g., four 4-video-second requests is typically enough for any network with RTT less than 12 s.

One might wonder why a minimum train size is needed if requests are being pipelined, since the video player is continuously downloading data anyway. The answer is that it is needed for when the buffer fills and the player oscillates between downloading data and pausing to drain the buffer. During this period, Sprint enforces the minimum train size each time downloading resumes, even if the amount of data required to fill the buffer is less than this size. (We allow the buffer to fill past its target level if necessary.) As shown in our evaluation, this is necessary for good performance (FIG. 9).

4.2.2. Sprint-x: Expanded Range Requests

Our second mechanism requests a larger range of data in each HTTP request. In DASH video, it is common for servers to store a video as a single, contiguous file. To fetch individual segments, players use the HTTP Content-Range header to specify a byte range within the file. Sprint-x simply increases this byte range to span at least the chunk size. Note that this approach will not work if video segments are stored as separate files.

To change the bitrate in the middle of a chunk download, the video player can call the cancel( ) method on the current HTTP request and issue a new request. Canceling a request closes the underlying TCP connection, and starting a new connection incurs a throughput penalty. Thus, frequent bitrate changes will decrease overall throughput. As shown in our evaluation, this tradeoff leads to a disadvantage for Sprint-x when compared to Sprint.

5. A BETTER BROWSER API FOR STREAMING

In HTML5 video, media files are fetched using XMLHttpRequest (XHR) requests (commonly used in AJAX) or the new experimental Fetch API. Because of issues related to head-of-line blocking and misbehaving servers and proxies, most browsers either do not support HTTP pipelining or disable it by default. Moreover, browsers do not expose an API to control individual connections or how requests map onto them. This makes it impossible to implement Sprint inside a regular web page. Instead, Sprint is implemented as a Chrome extension, which gives it access to a lower-level socket API.

To enable regular HTML5 sites to use Sprint, we need to extend the browser API to support pipelining. Note that we are not advocating to change the default pipelining behavior of web browsers, but rather to add the ability to explicitly control it for advanced uses. Our specific proposal is to extend the still-experimental Fetch API. Currently, the Fetch API exposes a fetch(request) function, where a request object is constructed with a set of options. We suggest adding an option called pipelineId whose value would be a string indicating a connection identifier. All requests with the same pipelineId would be pipelined together on the same connection (if possible).

6. IMPLEMENTATION

We have implemented two different video players: Sprint, our pipelined approach, and Sprint-x, our expanded-rangerequest approach. Both players are modifications of a reference video player created by the DASH Industry Forum. As mentioned above, the Sprint player is run as a Chrome extension to allow it to pipeline requests, while Sprint-x runs as a regular HTML5 web page.

Both players must provide an estimate of bandwidth and RTT to Program 1 in order to get the chunk size. Unfortunately, there is no standard way of accessing TCP's estimate of RTT from the browser. Instead, we estimate RTT by sending an XMR request for 10 bytes to the server every second and use the Resource Timing API to get accurate latency information. We use an EWMA to smooth out this estimate. To estimate bandwidth, we compute an EWMA over the measured throughputs of our HTTP requests. To increase stability, we down-weight the measurements of smaller requests. All of these are standard techniques.

Unless otherwise specified, we use an ABR algorithm modeled after the best-in-class solution of Huang, which was designed to address the problems identified by prior work—using it thus serves to highlight the problems identified (and improvements achieved) by our work. The algorithm selects the video bitrate based on the level of the video buffer: every time the buffer level increases (decreases) by 10 video-seconds, the bitrate is increased (decreased). To prevent oscillation, the algorithm never switches to the last chosen bitrate.

7. EVALUATION

We compare the performance of Sprint against leading industry players, and answer the following questions:
(1) Does Sprint perform better than today's video players?
(2) Does Sprint work well with many different control plane algorithms?
(3) Is the pipeline train necessary for good performance?
(4) Is Sprint's performance robust to varying bottleneck bandwidths, queue sizes, and number of competing flows as well as competing against other video flows?
(5) Does the expanded-range-request approach (Sprint-x) perform as well as pipelining (Sprint)?

7.1. Experimental Setup and Methodology

Fixed Broadband Networks.

To evaluate video performance on fixed broadband networks, we emulate a range of bottleneck network conditions. We connected (via wired Ethernet) two laptops to a Cisco E1200 home router. We installed DD-WRT on the router and used Linux's token-bucket filter (tbf) to adjust downstream bandwidth and queue sizes. In all of our experiments, our ISP's actual downstream bandwidth was greater than that permitted by the token bucket. Unless otherwise specified, the experiments used a bottleneck bandwidth of 3 Mbps and a queue size of 256 KB (although some experiments go up to 25 Mbps and 1536 KB, respectively). These are representative values: 3 Mbps was chosen from the Netflix ISP Speed Index for the US, and 44% of home internet connections have a download queue size of 256 KB or greater (see Section 7.4). The TCP buffers on both laptops were tuned to avoid being limited by TCP flow control in all the network scenarios tested.

Mobile Networks.

We also performed experiments on mobile devices running on the T-Mobile network. No traffic shaping was used for these experiments.

Measuring Performance.

Since we propose a data plane solution that is independent of the control plane, most of our experiments report the network throughput of video flows, rather than standard QoE metrics. Assuming smooth playback, network throughput is an upper bound on achievable video bitrate. We typically measure the percent of fair-share throughput achieved by a video flow when competing against a bulk TCP flow. We define fair share as the total bandwidth divided by the number of flows. We measure total bandwidth by summing the throughput of all flows: this allows us to measure fair share in networks we do not control (e.g., in our cellular network experiments), and relies on the fact that bulk flows expand to consume any unused bandwidth. We measure throughput by analyzing tshark traces collected during each experiment.

Our measure of fairness is easy to interpret: if a flow achieves X % of fair-share throughput, then the video bitrate can be at most X % of the optimal rate. We chose this fairness measure instead of alternatives like Jain's fairness index (JFI), because it isolates the discrepancy of the video flows from the competing bulk flows, which we already know achieve their fair share. However, we use JFI when video flows compete against other video flows.

Our evaluation often compares Sprint against the DASH player as a baseline, since DASH supersedes the industry players in most scenarios. To isolate the effects of our data plane solution, both DASH and Sprint use the same exact (control plane) ABR algorithm, which we described earlier. Thus, they only differ in how they download data: DASH downloads 4-second video segments sequentially, while Sprint (Sprint-x) uses our pipelining (expanded range request) solution with dynamic chunk sizing from Section 4. In all of our experiments, the maximum video bitrate is higher than the fair-share bandwidth. Since the ABR algorithm we use ensures that the video buffer never fills in this case, the weaknesses shown by DASH are not due to the pauses discussed in prior work.

7.2. Sprint Outperforms Existing Players

To demonstrate that even leading industry video-on-demand services fail to achieve their fair share of throughput, we evaluate the performance of YouTube, Netflix, Hulu, and Amazon Video. For each service, we stream videos via a web browser while simultaneously downloading a large file through the browser. Both the video and file download flows share the bottleneck link created by our home router or mobile connection. The video streams are otherwise unmodified and thus incorporate all of the services' network optimizations.

Fixed Broadband Networks.

FIGS. 7a-d trace the aggregate throughput of the video and file download flows for Netflix, Amazon, Hulu, and YouTube. The large gap in throughput that develops between the two flows indicates that the video flow is unable to achieve its fair share when competing against bulk flows. At the same time, the dotted line shows that in the absence of competition, these players are able to use their fair share to achieve a higher video bitrate.

We now show that it is the data plane, not the control plane, that is mostly responsible for this gap. The control plane can negatively affect a video flow's throughput if it stops requesting data or inserts pauses between requests, such as when the video buffer fills. Conversely, if the control plane is continuously requesting data, then the data plane should in principle be able to achieve the full fair share of throughput. We measured the pauses between consecutive requests for all players and found that they were less than 100 ms at the 95th percentile for Amazon, Netflix, and YouTube. This suggests that the control plane was not the culprit for these players. Hulu, on the other hand, had significant pauses between requests: 1373 ms at the 95th percentile.

Figure 6:
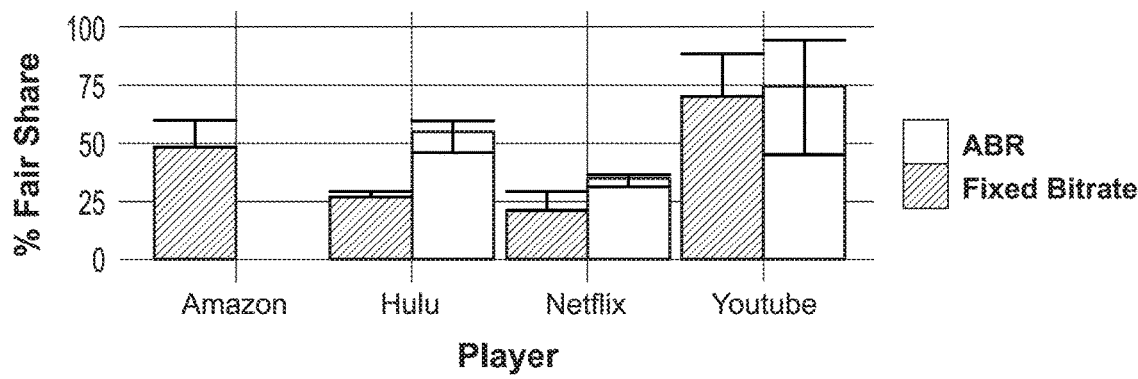
FIG. 6 is a graph illustrating example median percentile fair share achieved by industry players across five 25-minute experiments (error bars show maximum and minimum values). For the fixed bitrate experiments, the bitrate closest to the fair share of 1.5 Mbps was chosen (Amazon did not support manual bitrates).

To obtain a definitive answer, we conducted a controlled experiment that forced each player to use a fixed video bitrate close to the fair-share throughput, thus bypassing the ABR algorithm. All players except Amazon provide a setting to do this. FIG. 6 shows the results. Using the fixed bitrate, the pauses between requests for Hulu were reduced to 128 ms at the 95th percentile, and in general the video buffer never filled for any of the players. For all players, the degradation in throughput caused by using the ABR algorithm is only a small part of the total degradation from 100%. This means that the remaining degradation is due to the data plane.

Figures 7A, 7B:
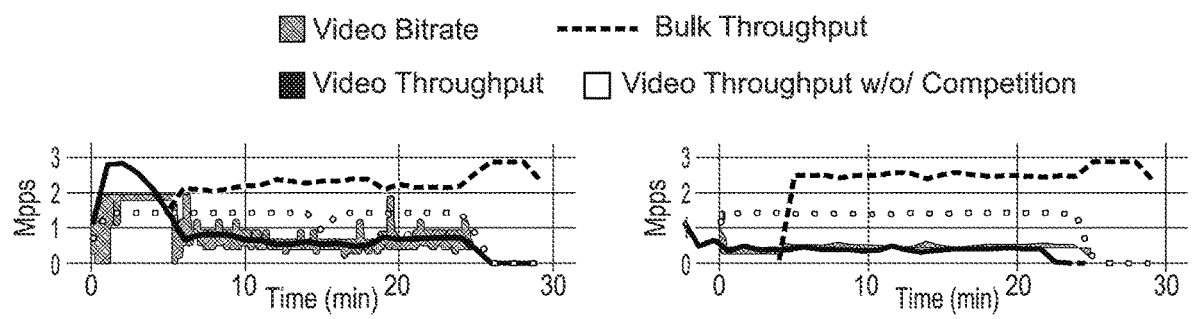
FIGS. 7a-d are graphs illustrating example aggregate throughput of various industry players when sharing a bottleneck link with a file download. Solid lines are the minute-averaged network throughput of the video players; dashed lines represent the bulk file download. Stippled lines show the bitrate of the video being downloaded. During the first (resp. last) five minutes, the only active flow was the video (resp. file) download; thus the percent of fair share was calculated for minutes 5-25. The dotted line shows the video throughput of a separate experiment which is run over a 1.5 Mbps link with no competing flow.
Figures 7C, 7D:
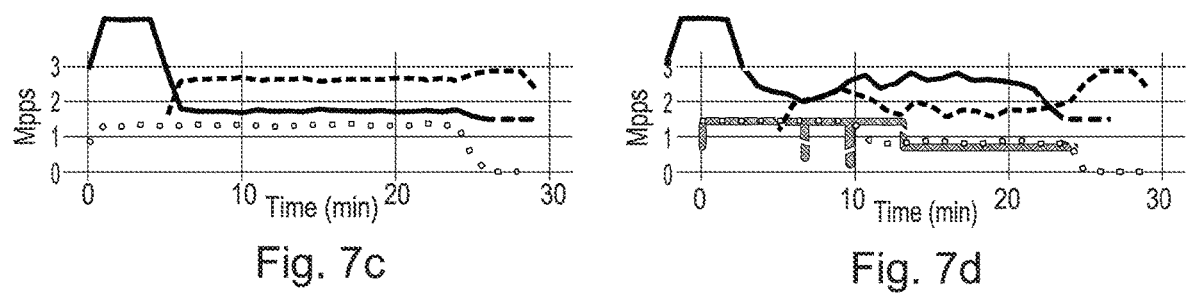

YouTube does not perform as well as the other players when operating without competing flows at (FIG. 7d). This is due to a large gap in bitrate encoding levels at this bandwidth setting: the closest bitrates are 727 Kbps and 1469 Kbps. YouTube's ABR tends to drop to the lower bitrate in the middle of playback. For the fixed bitrate experiment in FIG. 6, we forced the player to use the higher bitrate throughout, but YouTube still used only 75% of its fair-share.

Using the same experimental setup, we evaluate our Sprint and Sprint-x players as well as the DASH player. FIGS. 8a-c clearly show that both Sprint and Sprint-x outperform DASH and achieve close to—slightly more, in the case of Sprint—their fair share of throughput.

Mobile Networks.

We tested the mobile performance of the industry players by using each service's mobile app, and also by running the web browser version of the service on a laptop connected to the Internet via USB tethering. Both experiments were instructive. The app experiment revealed that these services did not implement any (effective) special logic to compensate for the large latencies of mobile networks. At the same time, the tethering experiment made sure that the performance of the video player was not affected by any limitations built into the app (e.g., to save mobile data). The tethering experiment was also necessary because we noticed that the throughput of some of the apps was limited by the TCP send window, perhaps due to limited receive buffers. The tethering experiment ran on a laptop with a TCP stack tuned so as to avoid this limitation.

Table 2 shows the results when playing a video concurrently with a file download in each experiment.

TABLE 2

Network fair share used by video services run over a mobile network while competing against a file download. The measurement period lasts 10 minutes. Hulu could not sustain playback while using a tethered connection.

|  | YouTube | Netflix | Hulu | Amazon |
|---|---|---|---|---|
| App | 49% | 27% | 18% | 11% |
| Tether | 47% | 48% | N/A | 30% |

Both the app and tethering experiments show that the video services are not able to achieve their fair share of throughput over mobile networks.

In contrast, Sprint is able to fully utilize its fair share of mobile bandwidth. We tested both the Sprint and DASH players by streaming a video for 10 minutes while performing a file download on a laptop connected by USB tethering. Each experiment was repeated five times. The average percent of fair-share throughput achieved was 98% for Sprint and only 80% for DASH.

7.3. Sprint Works Well with Many Different ABR Algorithms

Sprint provides a data plane solution that allows many different control plane (ABR) algorithms to achieve good network performance. This allows the control plane to focus on optimizing the viewer's QoE and freely adapt the bitrate without worrying about the network.

In general, ABR algorithms strive to achieve the highest possible video bitrate without causing rebuffering. They are often characterized by their aggressiveness—i.e., how high they make the bitrate. To show that Sprint performs well across a range of aggressiveness settings, we use a simple ABR algorithm that matches the video bitrate to a percentage of the measured network throughput. FIG. 9 shows the results. Since an aggressiveness of less than 100% is expected to use less than the full fair share, we present the results in terms of expected fair share, which we define as min(100%, aggressiveness) times fair share.

As FIG. 9 shows, Sprint achieves its fair share of throughput even when the ABR algorithm is less aggressive. This is a challenging scenario because the video buffer often fills and causes pauses in downloading. Prior work showed that video players underperform in this regime and proposed new ABR algorithms to avoid pauses. In contrast, Sprint uses the pipeline train size to ensure that enough data is transferred between pauses (Section 4.2.1). FIG. 9 shows that when the train size is not enforced, network throughput degrades significantly for aggressiveness settings less than 100%. Many ABR algorithms fall into this category due to the desire to avoid rebuffering events, which negatively impact QoE. For example, the default ABR algorithm that ships with DASH has an aggressiveness of 90%.

7.4. Sprint's Performance is Consistent Across Different Network Parameters

Sprint maintains its good performance across a wide range of network conditions. In contrast, DASH, which does not benefit from our data plane mechanisms, performs poorly in many realistic scenarios.

Varying Bottleneck Bandwidth and Queue Size.

Figure 10:
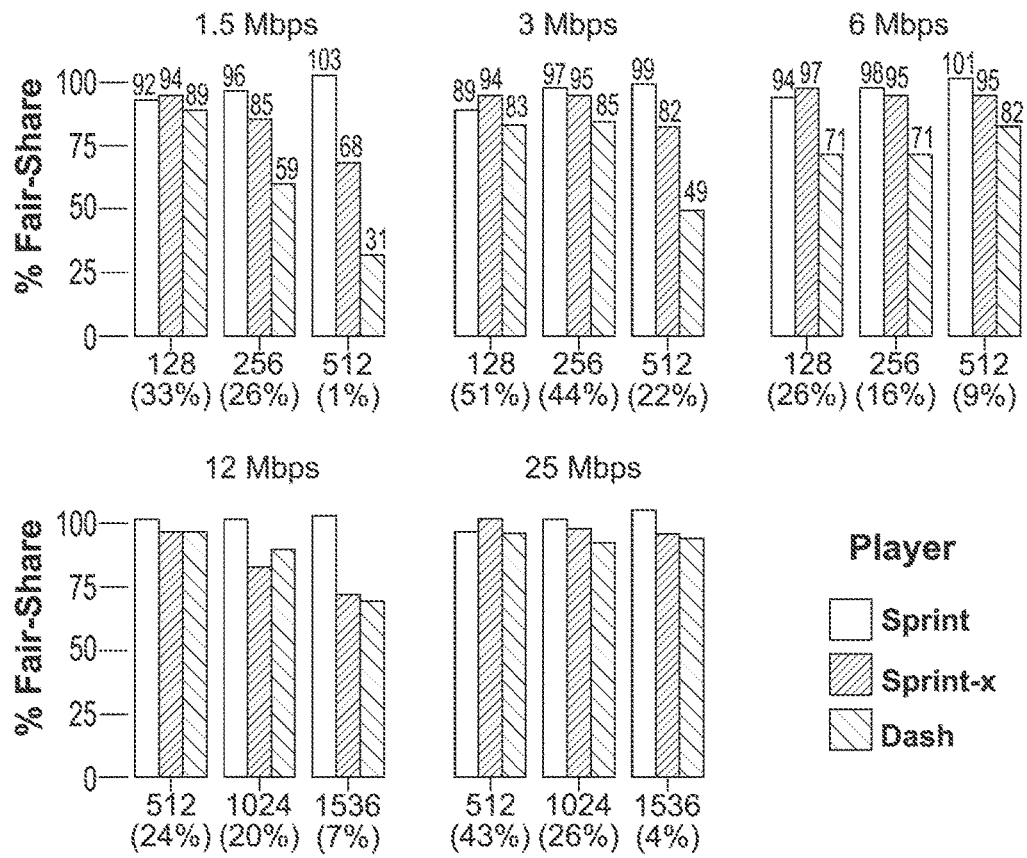
FIG. 10 includes graphs illustrating example median percentile fair-share of throughput achieved by the video players across five experiments, each lasting twenty minutes. For each bandwidth and queue size combination, the percentage of home internet connections with the given bandwidth and download queue size ≥given queue size is shown.

FIG. 10 shows the percent of fair-share throughput achieved by Sprint and DASH as we vary the bottleneck bandwidth and queue size. In all cases, Sprint achieves its fair share of throughput. Our analysis from Section 3 gives us the insight necessary to explain the performance of DASH. DASH's throughput deteriorates when queue size grows while bandwidth remains constant because competing flows induce longer queuing delays, inflating BDP. Conversely, when bandwidth is increased while queue size is held constant, video throughput improves. In this case, BDP does not actually increase that much because the queuing delay decreases, but the downloaded segments are larger because a higher video bitrate is achieved.

We use network parameters in our model that are representative of real home networks. To estimate the bottleneck queue size in these networks, we use a method similar to the one used by Sundaresan et al. (S. Sundaresan, W. De Donato, N. Feamster, R. Teixeira, S. Crawford, and A. Pescapè. Broadband internet performance: a view from the gateway. In *ACM SIGCOMM Computer Communication Review*, 2011). We begin with data from an ongoing study of home networks in the US run by the FCC and SamKnows. This dataset includes an experiment in which the home router pings a server while simultaneously performing a download. The maximum RTT experienced by the pings is representative of the bottleneck queue size. We multiply this value by the link bandwidth to estimate the queue size, and we use the result to determine the percent of home connections with a certain queue size or greater. FIG. 10 annotates these percentages next to the appropriate queue size and bandwidth setting. Since performance degrades with larger queues for players like DASH, the percentages indicate the number of home connections whose performance will be no better than that shown.

Varying the Number of Competing Bulk Flows.

When a video flow competes with multiple bulk flows, its performance is similar to when it competes with a single bulk flow. For example, when competing against four bulk flows, DASH achieves a median 80% of fair-share throughput across five 30-minute experiments, while Sprint achieves 102%. The results for a single competing bulk flow are 85% and 97%, respectively. Intuitively, adding more bulk flows reduces the video flow's fair share of bandwidth, causing it to use a lower bitrate and thus segment size. Since both fair-BDP and segment size reduce simultaneously, the net effect is canceled out.

Competing Against Other Video Flows.

Table 3 shows what happens when DASH and Sprint video flows compete against other video flows.

TABLE 3

Median unfairness measure (lower is better) and standard deviation across 5 experiments as different types of flows compete with each other. The bottleneck bandwidth is 3 Mbps.

|  | Queue Size | | | |
|---|---|---|---|---|
|  | 256 | | 512 | |
|  | Unfairness | Std. Dev. | Unfairness | Std. Dev. |
| Bulk vs Bulk | 0.03 | 0.18 | 0.05 | 0.07 |
| DASH vs DASH | 0.04 | 0.01 | 0.10 | 0.04 |
| DASH vs Sprint | 0.12 | 0.04 | 0.49 | 0.05 |
| DASH vs Bulk | 0.15 | 0.02 | 0.45 | 0.02 |
| Sprint vs Sprint | 0.06 | 0.03 | 0.05 | 0.05 |
| Sprint vs Bulk | 0.03 | 0.02 | 0.03 | 0.04 |

We do not use the % of fair share as our measure of fairness in these experiments, because we cannot assume that either flow is acting fairly or correctly (as we could for bulk flows). Instead, we evaluate (un)fairness using the same measure as in Festive: Unfairness=$\sqrt{1-\text{JFI}}$, where JFI is Jain's fairness index. Thus, a lower value implies more fairness. We show the unfairness measure for two competing bulk flows to provide a baseline. It is clear that DASH vs DASH performs only slightly worse than this baseline. When Sprint competes against DASH, there is a lot of unfairness because DASH is unable to achieve its fair-share throughput in much the same way it underperforms when competing against bulk flows. In fact, when competing against Sprint, DASH only achieves 88% of its fair-share throughput with a queue size of 256 KB, and 43% with a queue size of 512 KB. In contrast, Sprint performs well when competing with other video flows and bulk flows.

7.5. Sprint-x is Better than DASH but not as Good as Sprint.

Figure 11:
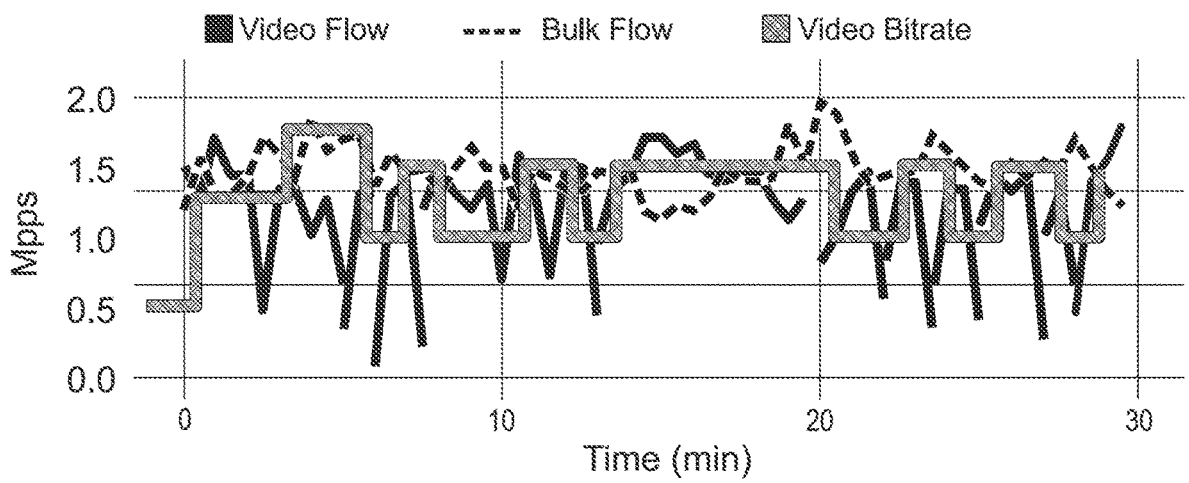
FIG. 11 is a graph illustrating example throughput and video bitrates of the Sprint-x competing against a bulk flow. When the ABR changes the video bitrate, the player often has to close an existing flow and start a new one (each new flow is shown as a separate solid line). This causes the throughput to drop.

As discussed in Section 4.2.2, the expanded-range-request approach used by Sprint-x requires the video player to cancel ongoing requests in order to switch the video bitrate. But canceling a request requires closing an ongoing TCP flow and creating a new one, causing a throughput penalty. This is illustrated by FIG. 11, which shows a decrease in throughput every time the ABR algorithm switches the bitrate. In fact, the only time when the video flow competes fairly with the file download is during minutes 15-20 when no bitrate changes occur. FIG. 10 shows that while Sprint-x performs better than unmodified DASH, it performs worse than Sprint because Sprint does not incur a throughput penalty when switching bitrates.

8. CONCLUSION

We show that TCP dynamics interact poorly with data transfers that use small, sequential web requests, instead of the bulk transfers TCP was designed for. To solve this problem and allow video flows to achieve their fair-share throughput, we derive and implement a data plane mechanism for sizing and structuring requests. Our evaluation shows significant and consistent improvements in achieved throughput over state-of-the-art and industry video players. Our mechanism works with any control plane and thus raises the tide for all ABR algorithms.

Figure 12:
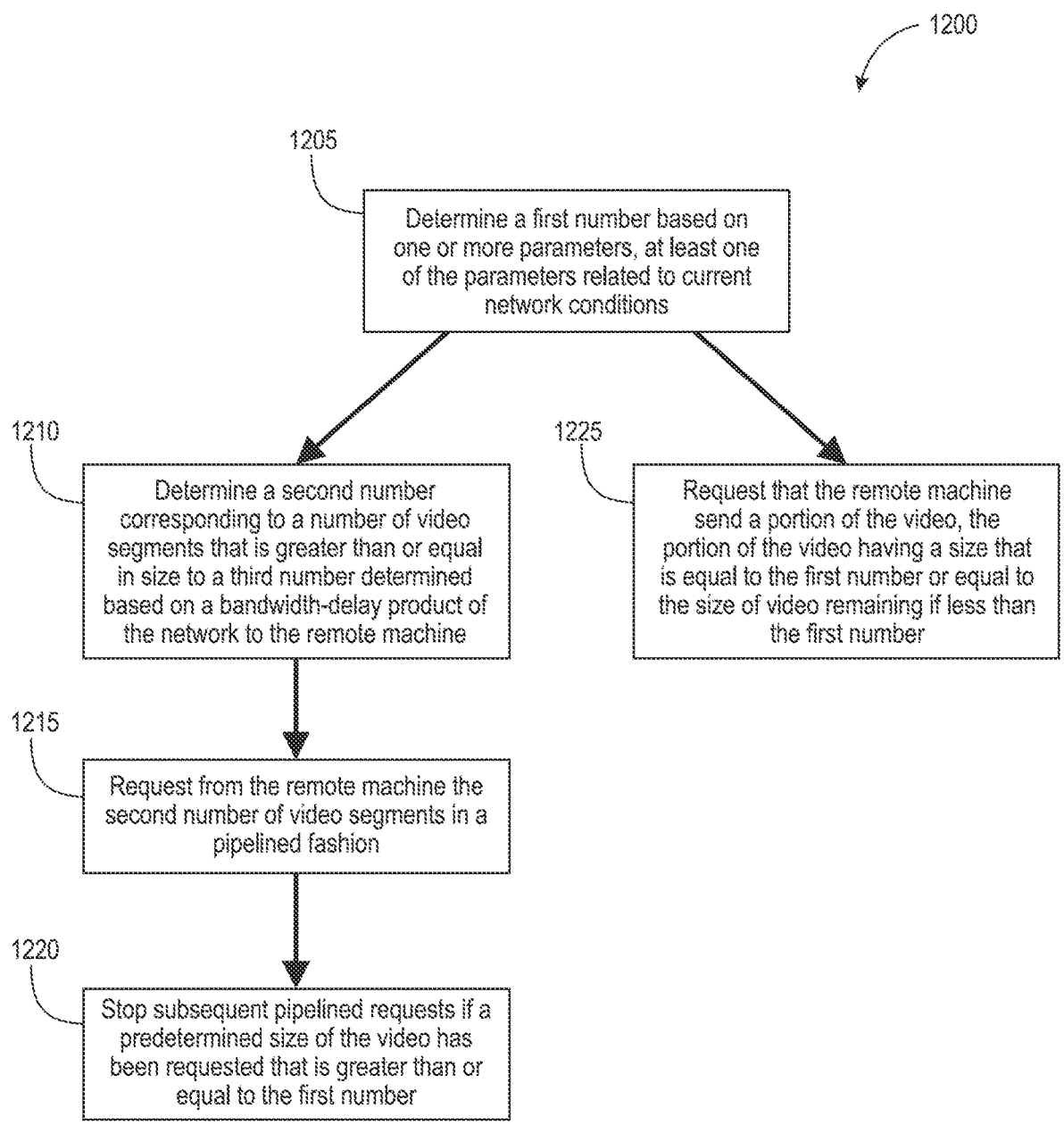
FIG. 12 is a flow diagram illustrating improving video streaming performance of a video in a system having a client machine and remote machine, according to example embodiments.

FIG. 12 is a flow diagram illustrating methods 1200 for improving video streaming performance of a video in a system having a client machine and remote machine, according to example embodiments. FIG. 12 illustrated two options for improving video streaming performance. One uses pipelined requests and can runs as a browser extension ("Sprint", 1205, 1210, 1215, and 1220). The other is based on expanded range requests and can runs inside a regular web page ("Sprint-x", 1205 and 1225). Both options begin with the client machine determining 1205 a first number based on one or more parameters, where at least one of the parameters is related to current network conditions.

If using pipelined requests, then a second number corresponding to a number of video segments of the video is determined 1210 by the client machine, where the number of video segments is calculated by a total size of the video segments, and the second number is greater than or equal in size to a third number. The third number is determined based on at least a bandwidth-delay product of the network to the remote machine, and is no less than two. The client machine requests 1215 from the remote machine the second number of video segments in a pipelined fashion, wherein a subsequent request for a video segment of the video is made before a response to a prior request is at least partially received, provided that no less than the second number of video segments are outstanding at any one time. Another subsequent request is made if fewer than the second number of video segments are outstanding. Subsequent pipelined requests are stopped 1220 if a predetermined size of the video has been requested that is greater than or equal to the first number.

If using expanded range requests, the client machine requests 1225 that the remote machine send a portion of the video, where the portion of the video has a size that is equal to the first number or equal to the size of video remaining if less than the first number.

One of ordinary skill in the art would understand that these deployment scenarios (Sprint as a browser extension, and Sprint-x within a regular web page utilizing code, such as javascript), reflect API limitations in currently-deployed browsers, and are not fundamental limitations of the disclosed methods and systems. The disclosed methods and systems can be utilized more generally in a variety of settings for improving the quality of video streaming, including with technologies that use application-level protocols other than HTTP, provided that the application protocol uses a transport protocol with an adaptive control loop (e.g., TCP).

Digital Processing Environment

Figure 13:
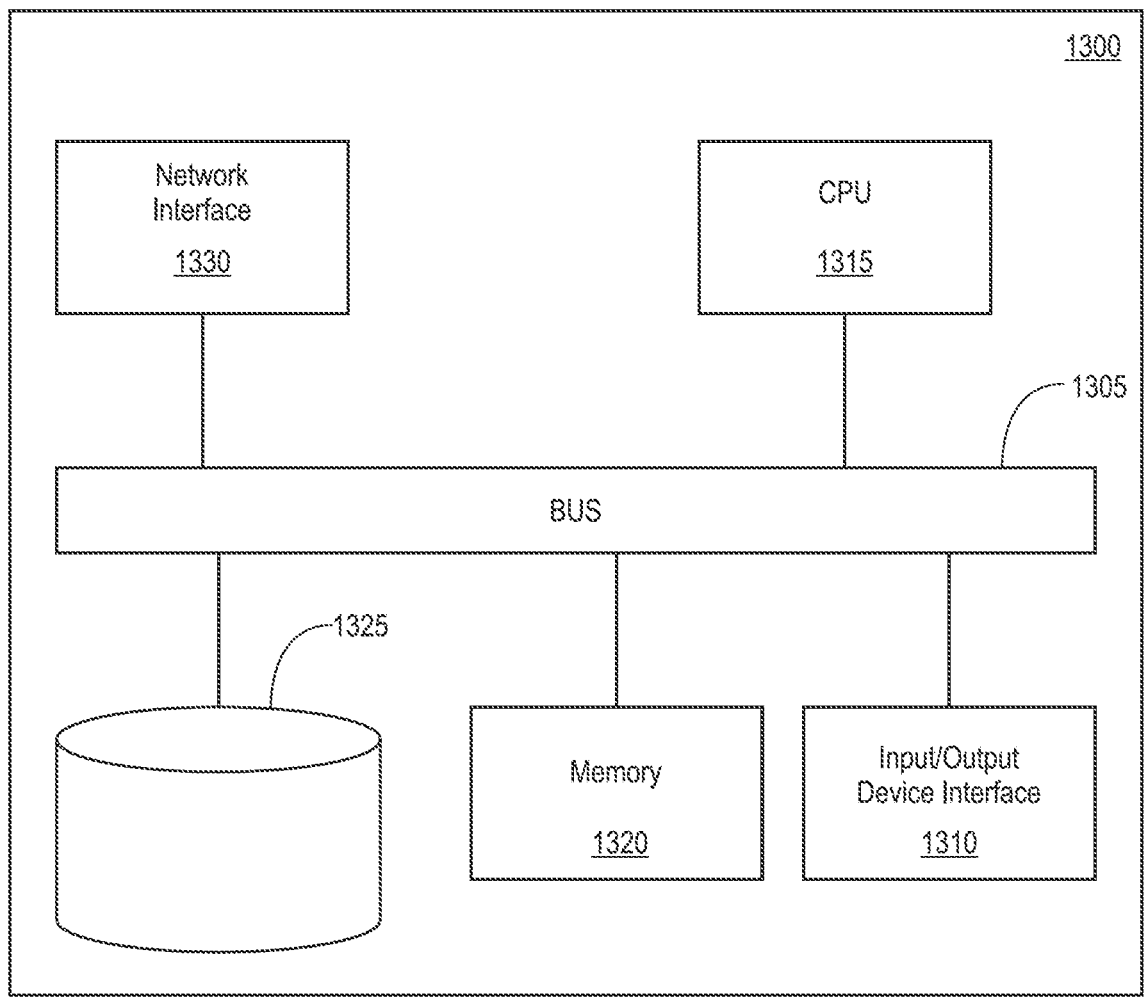
FIG. 13 is a simplified block diagram of a computer-based system that may be used for video streaming, according to an example embodiment.

FIG. 13 is a simplified block diagram of a computer-based system 1300 that may be used for video streaming, according to an example embodiment of the present invention. The system 1300 comprises a bus 1305. The bus 1305 serves as an interconnector between the various components of the system 1300. Connected to the bus 1305 is an input/output device interface 1310 for connecting various input and output devices such as a keyboard, mouse, display, touch screen overlay, speakers, camera, sensor feeds, controllers, etc. to the system 1300. A central processing unit (CPU) 1315 is connected to the bus 1305 and provides for the execution of computer instructions. Memory 1320 provides volatile storage for data used for carrying out computer instructions. Storage 1325 provides non-volatile storage for software instructions, such as an operating system (not shown). In particular, memory 1320 and/or storage 1325 are configured with program instructions implementing methods and/or modules 1200, 1205, 1210, 1215, 1220, and 1225 for improving video streaming, as detailed above and in association with FIG. 12, for example. The system 1300 also comprises a network interface 1330 for connecting to any variety of networks known in the art, including cloud, wide area networks (WANs), and local area networks (LANs), via a variety of types of network links, including wired, fiber optic, or wireless links.

It should be understood that the example embodiments described herein may be implemented in many different ways. In some instances, the various methods, systems, and devices described herein may each be implemented by a physical, virtual, or hybrid general purpose computer. The computer system 1300 may be transformed into the machines that execute the methods described herein, for example, by loading software instructions into either memory 1320 or non-volatile storage 1325 for execution by the CPU 1315.

Figure 14:
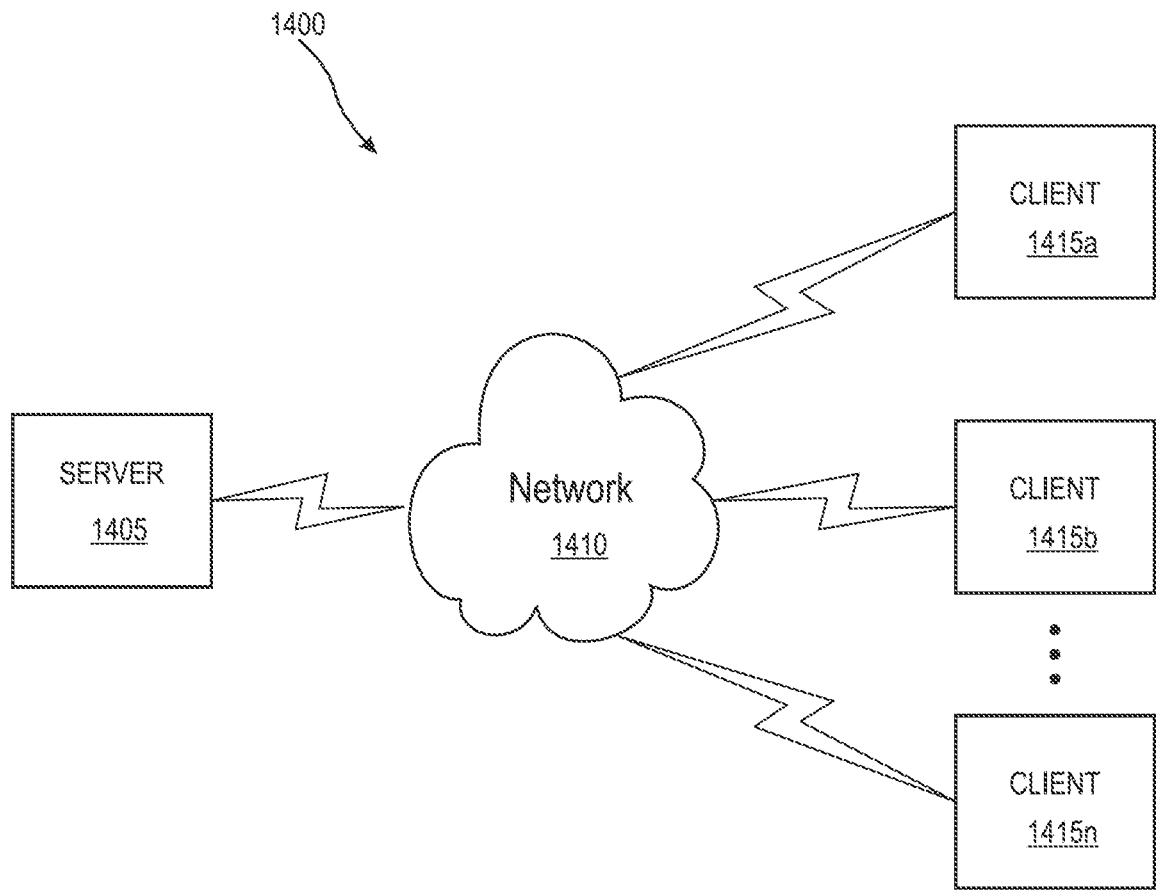
FIG. 14 illustrates a computer network environment in which embodiments may be implemented.

FIG. 14 illustrates a computer network environment 1400 in which embodiments of the present invention may be implemented. In the computer network environment 1400, the server 1405 is linked through a communications network 1410 to clients 1415a-n. In one embodiment, the client machine requesting a video may be one of clients 1415a-n, and the remote machine serving a video may be server 1405. The environment 1400 may be used to allow the clients 1415a-n, alone or in combination with server 1405 to execute any of the modules and/or methods described hereinabove (e.g., the methods and/or modules 1200, 1205, 1210, 1215, 1220, and 1225 as detailed above and in association with FIG. 12). It should be understood that the example embodiments described above may be implemented in many different ways. In some instances, the various methods and machines described herein may each be implemented by a physical, virtual, or hybrid general purpose computer, or a computer network environment such as the computer environment 1400.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims. As used in the claims, the term "or" is an inclusive "or."

What is claimed is:

1. A method for improving video streaming performance of a video in a system having a client machine and remote machine, the method being performed by the client machine and comprising:
   determining a first number based on one or more parameters, at least one of the parameters being related to current network conditions;
   determining a second number corresponding to a number of video segments of the video, as calculated by a total size of the video segments, that is greater than or equal in size to a third number determined based on at least a bandwidth-delay product of the network to the remote machine, the third number being no less than two;
   requesting from the remote machine the second number of video segments in a pipelined fashion, wherein a subsequent request for a video segment of the video is made before a response to a prior request is at least partially received, provided that no less than the second number of video segments are outstanding at any one time, and wherein another subsequent request is made if fewer than the second number of video segments are outstanding; and
   stopping subsequent pipelined requests if a predetermined size of the video has been requested that is greater than or equal to the first number.

2. The method of claim 1, wherein the requests occur via HTTP.

3. The method of claim 1, wherein the current network conditions include an estimated bandwidth to the remote machine.

4. The method of claim 1, wherein the current network conditions include an estimate of the network latency or round-trip time to the remote machine.

5. The method of claim 1, wherein determining the first number includes determining a first number based on two or more parameters, at least two of the parameters being related to network conditions.

6. The method of claim 5, wherein one of the two parameters is an estimated bandwidth to the remote machine.

7. The method of claim 5, wherein one of the two parameters is an estimate of network latency or round-trip time to the remote machine.

8. The method of claim 1, wherein determining the first number includes determining the first number based on an underperformance parameter used to determine how close performance should be to an optimal value.

9. The method of claim 1, wherein determining the first number includes determining the first number based on TCP estimates.

10. The method of claim 9, wherein the TCP estimates include a number of round-trips before TCP reaches a slow-start threshold or a bandwidth-delay-product.

11. The method of claim 9, wherein the TCP estimates include a number of bytes transferred before TCP reaches a slow-start threshold or a bandwidth-delay-product.

12. The method of claim 1, wherein the first number is determined by:
   determining an underperformance value;
   estimating a slow start threshold;
   calculating an initial number of network round-trips that occur between a beginning of a response and a slow start threshold;
   calculating a subsequent number of network round-trips that occur between the slow start threshold until a fair-bandwidth-delay product is reached;
   determining a total number of network round-trips based on the initial number of network round-trips, the subsequent number of network round-trips, and the underperformance value; and
   computing the first number based on the total number of network round-trips and the bandwidth-delay product.

13. The method of claim 1, further comprising using an adaptive bit-rate algorithm to select a bitrate of outstanding video segments.

14. An apparatus having improved video streaming performance, comprising:
   a transceiver;
   memory; and
   at least one processor operatively connected to the memory and the transceiver, the at least one processor being operative to:
   (i) determine a first number based on one or more parameters, at least one of the parameters being related to current network conditions; and
   (ii) at least one of:
      (a) determine a second number corresponding to a number of video segments of the video, as calculated by a total size of the video segments, that is greater than or equal in size to a third number determined based on at least a bandwidth-delay product of the network to the remote machine, the third number being no less than two, then request the second number of video segments in a pipelined fashion, and stop sending pipelined requests if a predetermined size of the video has been requested that is greater than or equal to the first number, and (b) request that the remote machine send a portion of the video, the portion of the video having a size that is equal to the first number or equal to the size of video remaining if less than the first number.

15. The apparatus of claim 14, wherein the processor determines the first number based on two or more parameters, at least two of the parameters being related to network conditions.

16. The apparatus of claim 14, wherein the apparatus is a server, workstation, desktop computer, laptop, smart phone or mobile device, wearable device, smart TV, video-game console, digital video recorder, digital-media center, projector, tablet, set-top box, streaming stick, dongle, smart hub, or gateway.

* * * * *

UNITED STATES PATENT AND TRADEMARK OFFICE
CERTIFICATE OF CORRECTION

PATENT NO. : 10,771,833 B2
APPLICATION NO. : 16/302363
DATED : September 8, 2020
INVENTOR(S) : Matvey Arye and Michael J. Freedman Page 1 of 1

It is certified that error appears in the above-identified patent and that said Letters Patent is hereby corrected as shown below:

In the Specification

At Column 1, Line 17, delete "U.S. Pat. No. 1,250,990" and insert --IIS-1250990--

Signed and Sealed this
Tenth Day of November, 2020

Andrei Iancu
*Director of the United States Patent and Trademark Office*